United States Patent
Tseng

(10) Patent No.: US 7,612,925 B2
(45) Date of Patent: Nov. 3, 2009

(54) DOUBLE-SIDE IMAGE SCANNER AND SCANNING METHOD OF THE SAME

(76) Inventor: Wen-Chao Tseng, No. 56, Ming-chu St. Wu-feng Hsiang, Taichung Hsien (TW)

( * ) Notice: Subject to any disclaimer, the term of this patent is extended or adjusted under 35 U.S.C. 154(b) by 1077 days.

(21) Appl. No.: 10/064,700

(22) Filed: Aug. 8, 2002

(65) Prior Publication Data
US 2004/0027620 A1 Feb. 12, 2004

(51) Int. Cl.
*H04N 1/04* (2006.01)
(52) U.S. Cl. .................. 358/496; 358/408; 358/498; 358/474
(58) Field of Classification Search ........... 358/408, 358/498, 496, 474, 401, 501, 505; 399/364, 399/374, 370–373; 355/23, 24; 382/312, 382/318, 319; 250/208.1, 234–236, 239
See application file for complete search history.

(56) References Cited

U.S. PATENT DOCUMENTS

| | | | | |
|---|---|---|---|---|
| 4,536,077 A | * | 8/1985 | Stoffel | 358/497 |
| 5,463,451 A | * | 10/1995 | Acquaviva et al. | 399/211 |
| 5,689,792 A | * | 11/1997 | Acquaviva et al. | 399/365 |
| 5,760,919 A | * | 6/1998 | Acquaviva et al. | 358/450 |
| 6,438,350 B1 | * | 8/2002 | Hasegawa et al. | 399/374 |
| 6,507,416 B1 | * | 1/2003 | Tang | 358/475 |
| 6,552,829 B1 | * | 4/2003 | Maciey et al. | 358/509 |
| 6,563,611 B1 | * | 5/2003 | Kao | 358/498 |
| 6,678,076 B1 | * | 1/2004 | Hasegawa et al. | 358/496 |
| 6,721,074 B1 | * | 4/2004 | Kao | 358/496 |
| 6,785,024 B1 | * | 8/2004 | Corby et al. | 358/474 |

FOREIGN PATENT DOCUMENTS

| | | |
|---|---|---|
| DE | 295 20 865 U1 | 7/1996 |
| DE | 198 35 348 A1 | 2/2000 |
| TW | 088207337 | 5/1999 |

\* cited by examiner

*Primary Examiner*—Cheukfan Lee
(74) *Attorney, Agent, or Firm*—Stolowitz Ford Cowger LLP

(57) ABSTRACT

A double-side image scanner module suitable for scanning a document having a first side and an opposing second side, having a paper feeder and an image extraction apparatus. The paper feeder has a paper-feeding through-channel through which document is transmitted. The paper-feeding through-channel is divided into a first-side scanning region for scanning the first side of the document, a second-side scanning region, aligned with the first-side scanning region for scan the second side of the document, and a paper-turning region between the first-side scanning region and the second-side scanning region, through which the document is turned up side down. A plurality of document transmission members is installed along the paper-feeding through-channel for transmitting the document. The image extraction apparatus is aligned with both the first- and second-side scanning regions to extract images of the first and second sides of the document through the first- and second-side scanning regions, respectively.

38 Claims, 10 Drawing Sheets

DOUBLE-SIDE IMAGE SCANNER AND SCANNING METHOD OF THE SAME

BACKGROUND OF INVENTION

1. Field of the Invention

The invention relates in general to an image scanner module and the scanning method thereof, and more particular, to a double-side image scanner module which uses a single image extraction and light source compensation to perform double-side scanning of a document, and a scanning method of the same.

2. Description of Related Art

Due to the technical advancement and rapid development, electronic industry has become one of the most important industries in modern society. Many high-performance calculating systems are produced, and more and more electronic products have actually frequently applied to daily lives. In recent years, the greatly improved processing speed and data storage of processor and computer related products greatly enhance the performance for graphic process, such that image-processing equipment such as optical scanners or digital camera commonly used.

Generally speaking, most of the conventional scanners are used for single-side image scanning. To scan double-side image of a document, manual page turning or two image extraction apparatus are required. Referring to FIG. 1, a conventional double-side image scanner module that uses two image extraction apparatus to read both sides of a document is shown. As shown in FIG. 1, the double-side image scanner module 100 comprises a U-shape rotating apparatus 102, a first transparent window 104, a first image extraction apparatus 106, a second transparent window 108, and a second image extraction apparatus 110.

Further referring to FIG. 1, while using the double-side image scanner module 100 for scanning, a document (not shown) is fed along the feeding direction and guided into a U-shape rotating apparatus 102 by a roller 114. During the paper feeding process, the document will pass through the first transparent window 104, under which the first image extraction apparatus 106 is installed to read the first-side image of the document. Another roller 116 is further installed in the U-shape rotating apparatus 102 to guide the document proceeding further.

The second image extraction apparatus 110 is installed under the second transparent window 108. When the document travels through the second window 108, the second-side image of the document is read by the second image extraction apparatus 110. The document is then guided by the roller 118 towards the paper discharging direction 120.

In the above double-side image scanner module 100, two image extraction apparatus 106, 110 are required, such that the overall structure is more complex. Further, the first image extraction apparatus 106 is located above the second image extraction apparatus 110 and the second transparent window 108, so that the height reduction is difficult to achieve. Therefore, this type of double-side image scanner module normally has a large volume.

SUMMARY OF INVENTION

The present invention provides a double-side image scanner module and the scanning method thereof to use a single image extraction apparatus and light source compensation to perform double-side image scanning.

The double-side image scanner module provided by the present invention has a reduced volume, so that the fabrication cost is lowered.

The double-side image scanner module suitable for scanning a document having a first side and an opposing second side comprises a paper feeder and an image extraction apparatus. The paper feeder has a paper-feeding through-channel allowing the document to be transmitted. In one embodiment, the paper-feeding through-channel is divided into a first-side scanning region for scanning the first side of the document, a second-side scanning region, aligned with the first-side scanning region for scan the second side of the document, and a paper-turning region, between the first-side scanning region and the second-side scanning region, through which the document is turned up side down. A plurality of document transmission members is installed along the paper-feeding through-channel for transmitting the document. The image extraction apparatus is aligned with both the first- and second-side scanning regions to extract images of the first and second sides of the document through the first- and second-side scanning regions, respectively.

The present invention further provides a scanning method for a double-side image scanner module applicable for scanning double-side image of a document having a first side and a second side. When both the first sides and the second sides of the document are to be scanned, the document is fed into a paper-feeding through-channel of the double-side image scanner module with the first side facing an image extraction apparatus while passing over a light transparent channel. The image of the first side is scanned by the image extraction apparatus. The document is then transmitted along the paper-feeding through-channel until the second side of the document is facing the image extraction apparatus while passing over the light transparent channel at a different height. The image of the second side is then scanned by the image extraction apparatus.

By installing two sensors to detect the first side and the second side before the document entering the light transparent channel, the image of the first and second sides of the document can be controlled with the same quality. Further, by switching on and/or off the sensors, one can selectively perform single-side or double-side image scan using the same double-side image scanner module.

As the present invention requires only one image extraction apparatus, such that the structure is simple, and the height of the double-side image scanner image can be further compressed. An image scanner with a small volume and low fabrication cost is thus obtained.

BRIEF DESCRIPTION OF DRAWINGS

These, as well as other features of the present invention, will become more apparent upon reference to the drawings wherein.

DETAILED DESCRIPTION

Figure 1:
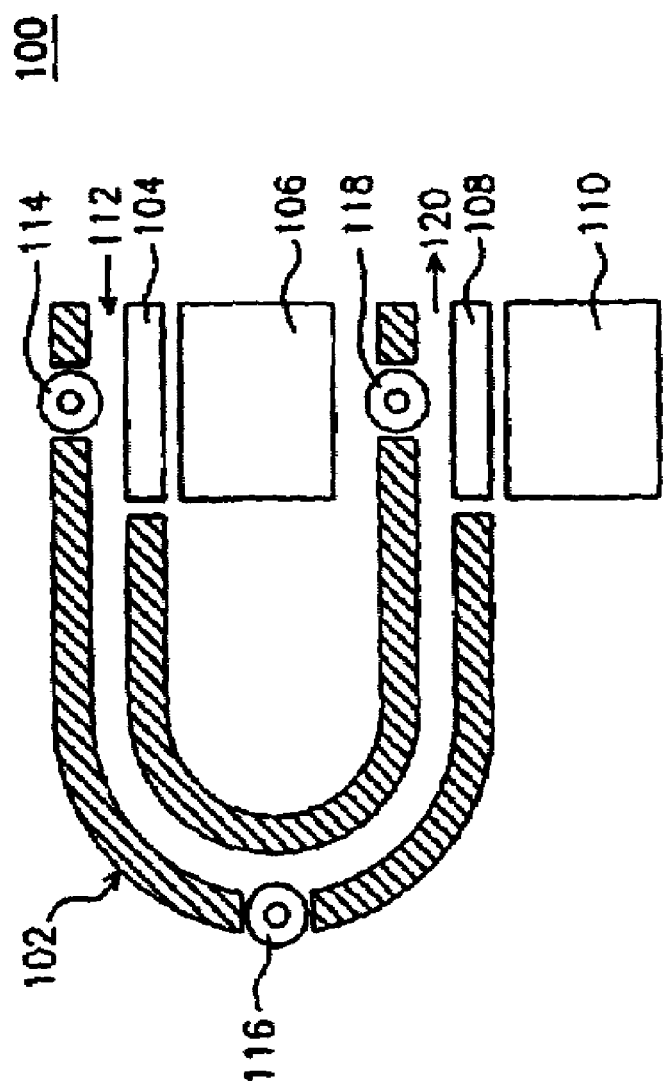
FIG. 1 shows a schematic side view of a conventional double-side image scanner module.
Figure 2:
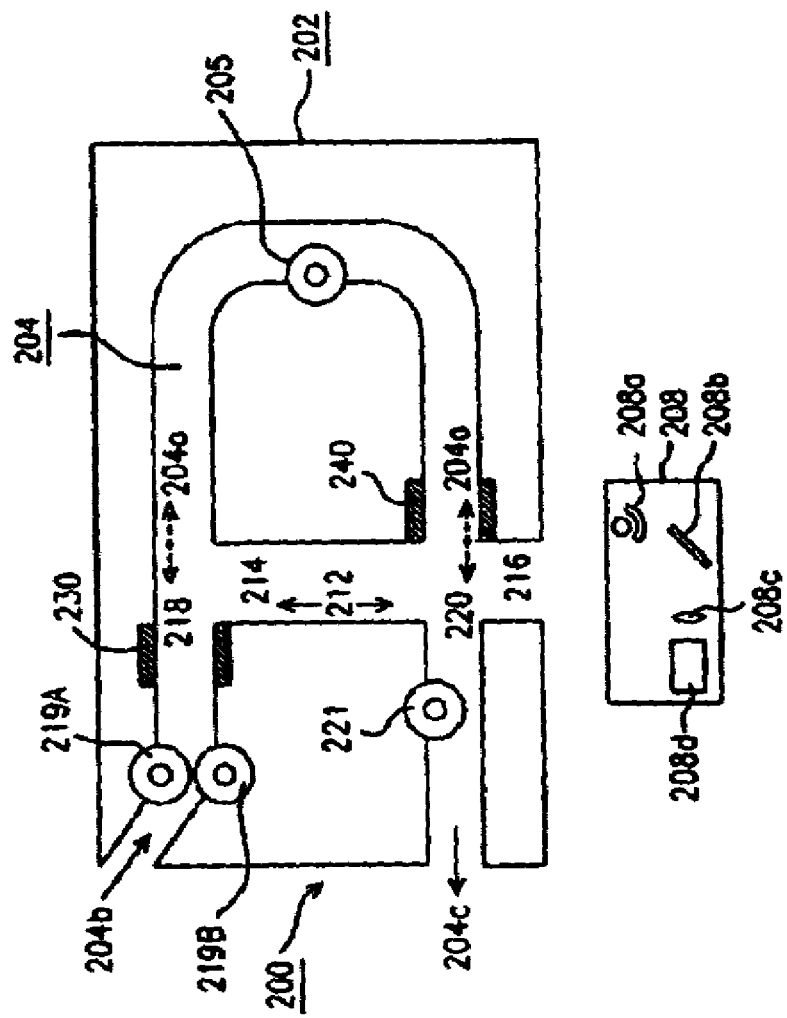
FIG. 2 is a cross sectional view schematically showing a double-side image scanner module according to the present invention.

Referring to FIG. 2, a schematic cross-sectional view of the double-side image scanner module provided by the first embodiment of the present invention is shown. In this embodiment, the double-side image scanner module 200 comprises a paper/sheet feeder 202 and an image extraction apparatus 208.

The paper feeder 202 includes a paper-feeding through-channel 204 through which a document to be scanned is fed and discharged. The paper-feeding through-channel 204 is further divided into three regions, including the paper-transmission region 218 connected to the paper-feeding port 204b, the paper-transmission region 220 connected to the paper-discharging port 204c, and the paper-turning region 204a between the paper-transmission regions 218 and 220. A first-side scanning region 214 is formed along the paper-transmission region 218, and a second-side scanning region 216 is formed along the paper-transmission region 220. Preferably, the paper-turning region 204a is defined between the first- and second-side scanning region 214 and 216. When the paper feeder 202 is vertically orientated, that is, when the paper or document is fed into and discharged from the paper feeder 202 vertically, the first- and second-side scanning region 214 and 216 are horizontally aligned with each other. In contrast, when the paper feeder 202 is horizontally orientated, that is, when the paper/document is fed into and discharged from the paper feeder 202 horizontally, preferably, the first-side scanning region 214 is aligned over the second-side scanning region 216. In FIG. 2, the paper feeder 202 is so oriented allowing the document to be fed and discharged horizontally. Therefore, in this embodiment, the first-side scanning region 214 is aligned over the second-side scanning region 216.

The paper feeder 202 further includes a plurality of rollers 219A, 219B, 205 and 221 along the paper-feeding through-channel 204 to provide transmission of the document within the paper feeder 202. To obtain effective and smooth transmission of the document, the number and position of the rollers can be varied according to specific requirements such as the length of the length of the paper-feeding through-channel 204 and the material of documents to be transmitted. In the exemplary drawing as shown in FIG. 2, the paper-feeding through-channel 204 has a "U" shape, and the paper-transmission regions 218 and 220 are parallel to each other, while the paper-turning region 204a having a curve is substantially perpendicular to both the paper-transmission channels 218 and 220.

The image extraction apparatus 208 is vertically or horizontally aligned with the first- and second-side scanning regions 214 and 216, according to the orientation of the paper feeder 202. The image extraction apparatus 208 includes a light source 208a, a reflector 208b, a lens 208c and an image extraction device 208d, for example, a charge-coupled device (CCD). The light source 208a includes an adjustable light source to emit variable light incident on the first and/or second side of the document. The reflector 208b and the lens 208c are so positioned to guide the light reflected from the document to the image extraction device 208d.

To use a single image extraction apparatus 208 to scan both sides of a document, a light transparent panel 210 is formed to extend from the first-side scanning region 214 through the second-side scanning region 216 to the image extraction apparatus 208 allowing light to travel through. Transparent windows may also be disposed on both the first- and second-side scanning regions 214 and 216. The material of the transparent windows includes transparent glass or plastic. According to specific requirement, such windows may include certain material transparent for only the light or image with a particular wavelength. In the embodiment of the U-shaped paper-feeding through-channel 204, the light transparent panel 210 is perpendicular to both the paper-transmission regions 218 and 220, such that light can travel between the first-side scanning region 214 and the image extraction apparatus 202, or between the second-side scanning region 216 and the image extraction apparatus 202.

The paper feeder 202 further includes two sensors 230 and 240 in the paper-transmission region 218 and the paper-turning region 204a, respectively, so that the document can be detected before passing through the first- and second-side scanning regions 214 and 216. The sensors 230 and 240 are in electrical or optical communication with the image extraction apparatus 208, such that upon the detection of a document, the image extraction apparatus 208 is activated thereby for scanning the document. For example, when the document is fed into the paper-feeding through-channel 204 and detected by the sensor 230, a signal is generated and output by the sensor 230 to activate the image extraction apparatus 208. The side of the document facing the image extraction apparatus 208 while passing through first scanning region 214 is thus scanned. After traveling through the paper turning region 204a and being detected by the sensor 240, the side of the document facing the image extraction apparatus 208 while passing through the second scanning region 216 is further scanned by the image extraction apparatus 208.

The sensors 230 and 240 can further be switched on or off. That is, in case the user intends to scan the first side of the document only, the sensor 230 is switched on and the sensor 240 is switched off. When both sides of the document are to be scanned, both sensors 230 and 240 are switched on. If only the second side of the document requires to be scanned, the sensor 230 is switched off and the sensor 240 is switched on. The scanning operation and the on/off status of the sensors 230 and 240 can be referred to Table I. Therefore, the double-side image scanner module is not only applied to double-side image scanning, but is also applied to single-side image scanner module with the function of selectively scanning between two sides of a document.

TABLE I

|  | Sensor 230 On | Sensor 230 Off |
| --- | --- | --- |
| Sensor 240 On | Scanning both sides of the document | Scanning second side of the document |
| Sensor 240 Off | Scanning first side of the document | Scanning neither side of the document |

Figure 3:
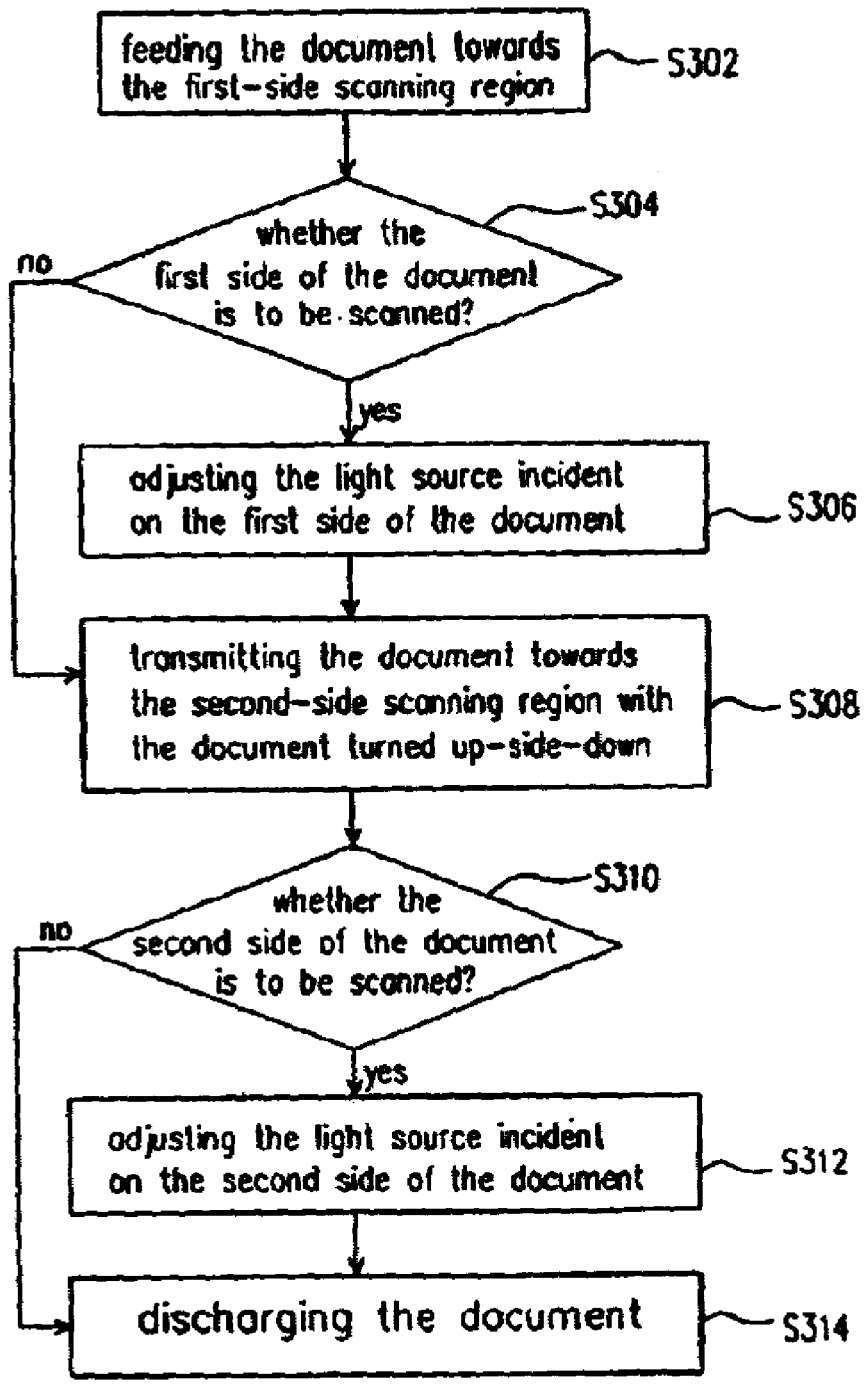
FIG. 3 is a process flow for performing scanning using the double-side image scanner module according to the present invention.
Figure 4A:
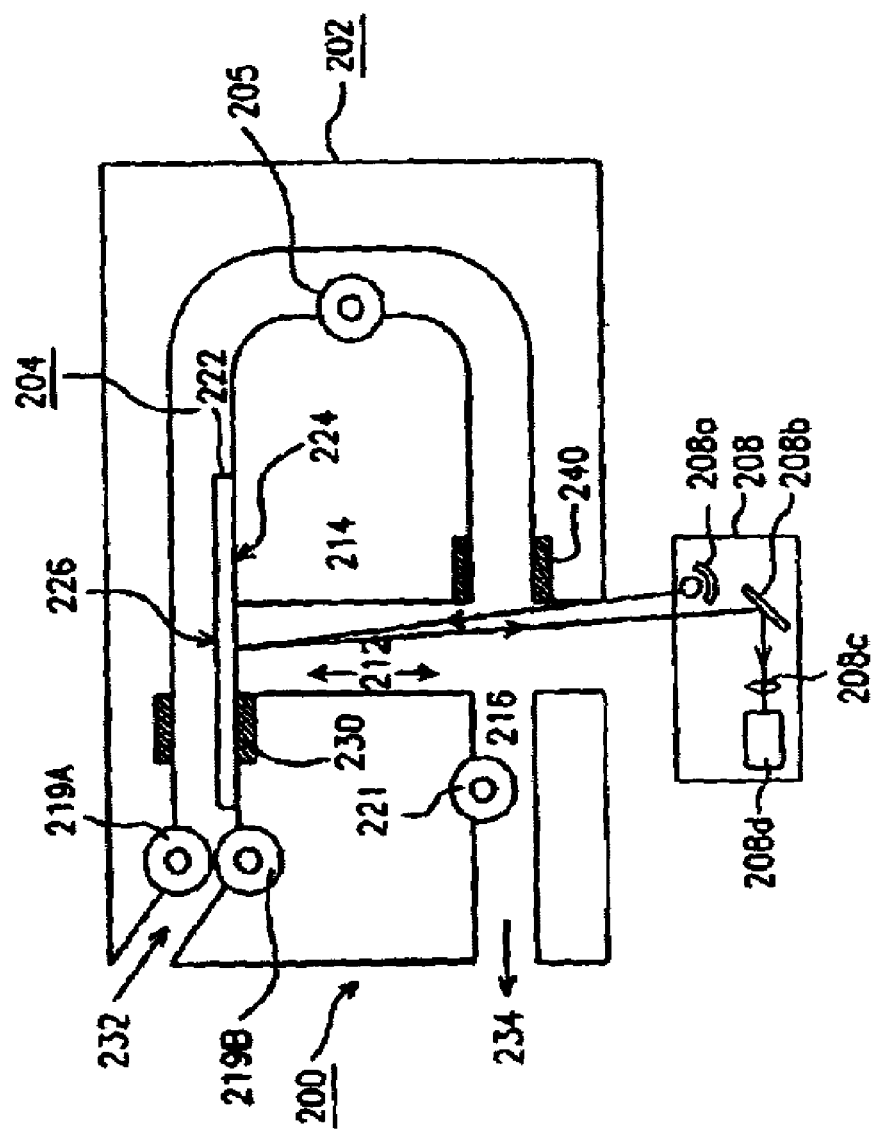
FIGS. 4A and 4B are cross-sectional views which schematically show the double-side image scanner module used in FIG. 3.
Figure 4B:
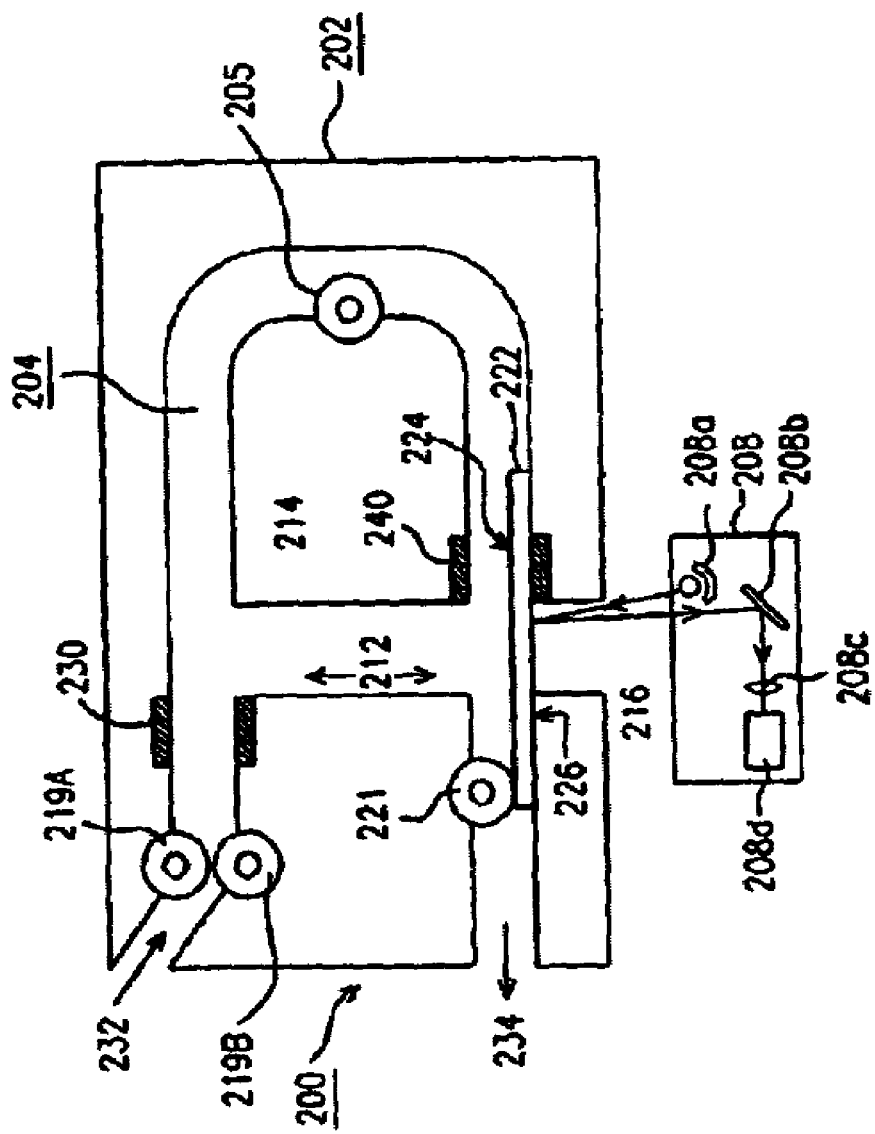

FIG. 3 shows a process flow for scanning both sides of a document using the double-side image scanner module 200 as shown in FIG. 2, while FIGS. 4A and 4B illustrate the process of the paper feeding and scanning.

Referring to FIG. 3 and FIG. 4A, in step s302, the document 222 is fed into the paper feeder 202 along the direction indicated by the arrow 232. Before or when the document 222 is approaching the first-side scanning region 214, the user may decide whether the first side 224 and/or the second side 226 are to be scanned or not. As mentioned above, the sensors 230 and/or 240 for detecting the respective sides 224 and 226 of the document 222 are thus consequently switched on or off (enabled or disabled). In step s304, if the first side 224 of the document 222 is not to be scanned, the sensor 230 is disabled, and the image extraction apparatus 280 is inactivated. After passing through the first-side scanning region 214, the document 222 is turned up side down through the paper-turning region 204a and approaches the second-side scanning region 216 in step 308. On the contrary, if the first side 224 is to be scanned in step s302, the sensor 230 is enabled to generate a signal carrying the image information of the side 224 when the document 222 passes through the first-side scanning region 214, such that the light source 208a of the image extraction apparatus 208 is adjusted according to the image information, and the image of the first side 224 is scanned in step s306. Similarly, the document 222 is then turned up side down through the paper-turning region 204a after exiting the first scanning region 214 and approaches the second scanning region 218 in step s308.

The mechanism for scanning the first side 224 of the document is illustrated in FIG. 4A. As shown in FIG. 4A, when the document 222 is disposed on the first-side scanning region 214, the first side 224 is facing the light transparent channel 212, such that the image of the first side 224 can be extracted by the image extraction apparatus 208. The light source 208 emits a light incident on the first side 224 of the document 220. The image of the first side 224 is then reflected thereby and incident on a reflector 208b. The reflector 208b includes a reflection mirror, for example. Being reflected by the reflector 208b, the image is incident on the image extraction device 208d after being collimated, converged, and/or focused by the lens 208c.

Upon entering the second-side scanning region 216, similarly, if the second side 226 is not to be scanned in step s310, the sensor 240 is disabled, and the image extraction apparatus 208 is inactivate. The document 222 is then discharged after passing through the second scanning region 216 in step s314. If the second side 226 is to be scanned in step s310, the sensor 240 is switched on to generate a signal carrying image information of the second side 226 to the image extraction apparatus 208 when the second side 226 of the document 222 is detected. The light source 208a is thus adjusted according to the image information of the second side 226, and the second side 226 is scanned in step s312. After scanning the second side 226 in step s312, the document 222 is discharged from the paper feeder 202 along the direction indicated by the arrow 234 as shown in FIGS. 4A and 4B.

Similarly, the mechanism for scanning the second side 226 of the document is illustrated in FIG. 4B. In FIG. 4B, traveling through the page-turning region 204a, the document 222 is turned up side down. That is, the document 222 disposed on the second-side scanning region 216 has the second side 226 facing the image extraction apparatus 208. Therefore, the image of the second side 226 can thus be extracted thereby.

Preferably, in steps s306 and s312, parameters of the light source 208a such as light intensity and angle incident upon the first and second sides 224 and 226 are so adjusted to result in substantially identical illumination and reflection path of the light reflected from both sides 224 and 226. That is, the light source 208a are so adjusted that the images of the first and second sides 224 and 226 extracted by the image extraction device 208d have the same image quality.

In this embodiment, a double-side image scanner module 200 comprises a paper feeder 202 and an image extraction apparatus 408. The structures of paper feeder 202 and the image extraction apparatus 408 are similar to those as shown in FIG. 2.

The allocation, structure and function of the paper feeder 202 are similar to those of the paper 202 described in the first embodiment.

According to the paper feeding direction of the paper feeder 202, the image extraction apparatus 408 (referring to 208 in FIG. 2) is aligned with the first- and second-side scanning regions 214 and 216, horizontally or vertically. The image extraction apparatus 408 includes a light source 408a (referring to 208a in FIG. 2), a reflector 208b, a lens 208c and an image extraction device 208d such as a charge-coupled device. The reflector 208b, the lens 208c are located at appropriate positions to guide the light reflected from the document to the image extraction device 208d. In this embodiment, the image extraction apparatus 408 is installed in a driving apparatus (not shown), such that the distance between the image extraction apparatus 408 and the first- and second-side scanning region 214 can adjusted. Further, the light source 408a includes the fixed light source or the adjustable light source used in the first embodiment.

The paper feeder 202 also includes the image sensors 230 and 240 installed at the paper-transmitting region 218 and the paper-turning region 204a, respectively. The function and operation theory of the sensors 230 and 240 are similar as those described in the first embodiment.

Figure 5:
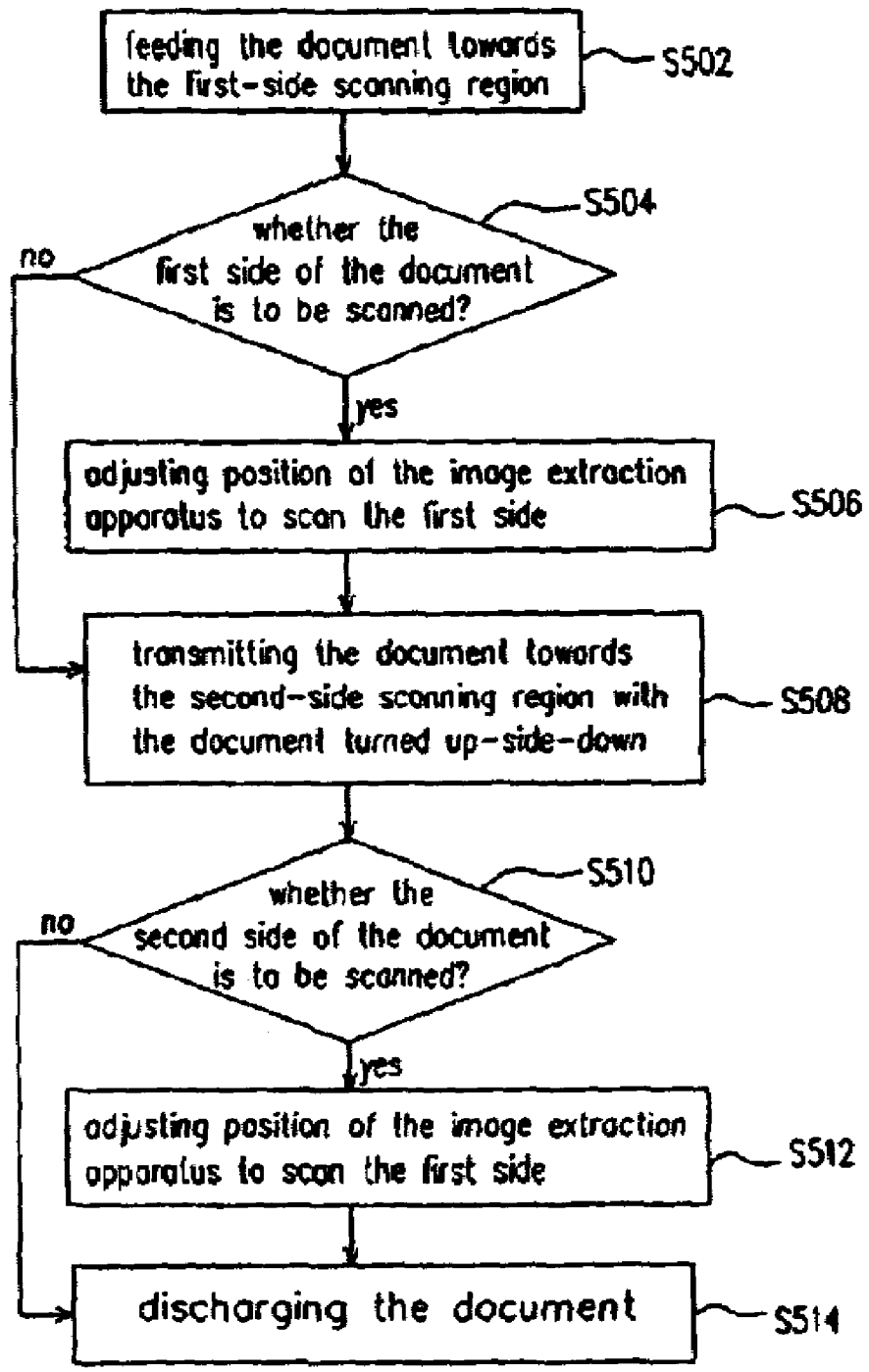
FIG. 5 is a process flow for performing double-side scanning using the double-side image scanner module according to a second embodiment of the present invention.
Figure 6A:
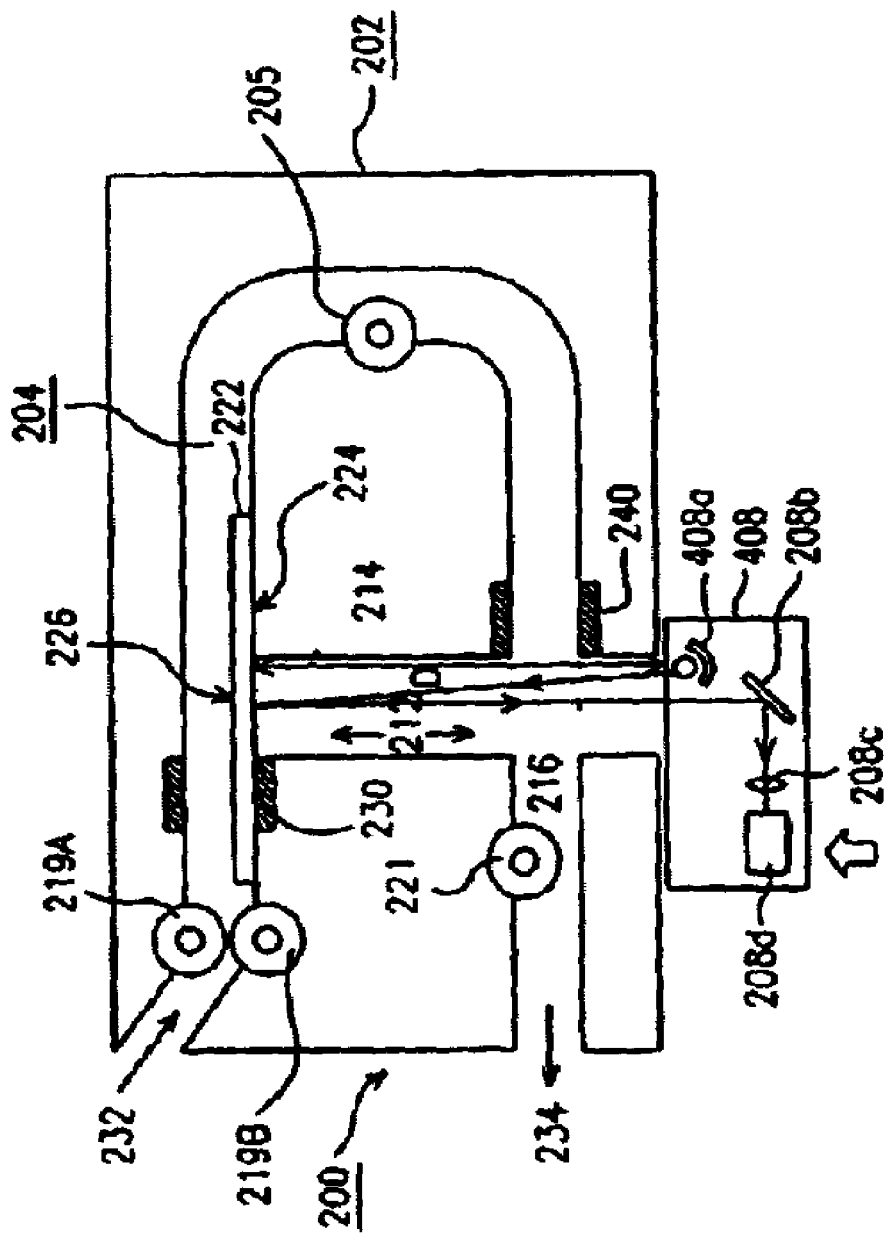
FIGS. 6A and 6B are cross-sectional views which schematically show a double-side image scanner module used in the second embodiment as shown in FIG. 5.
Figure 6B:
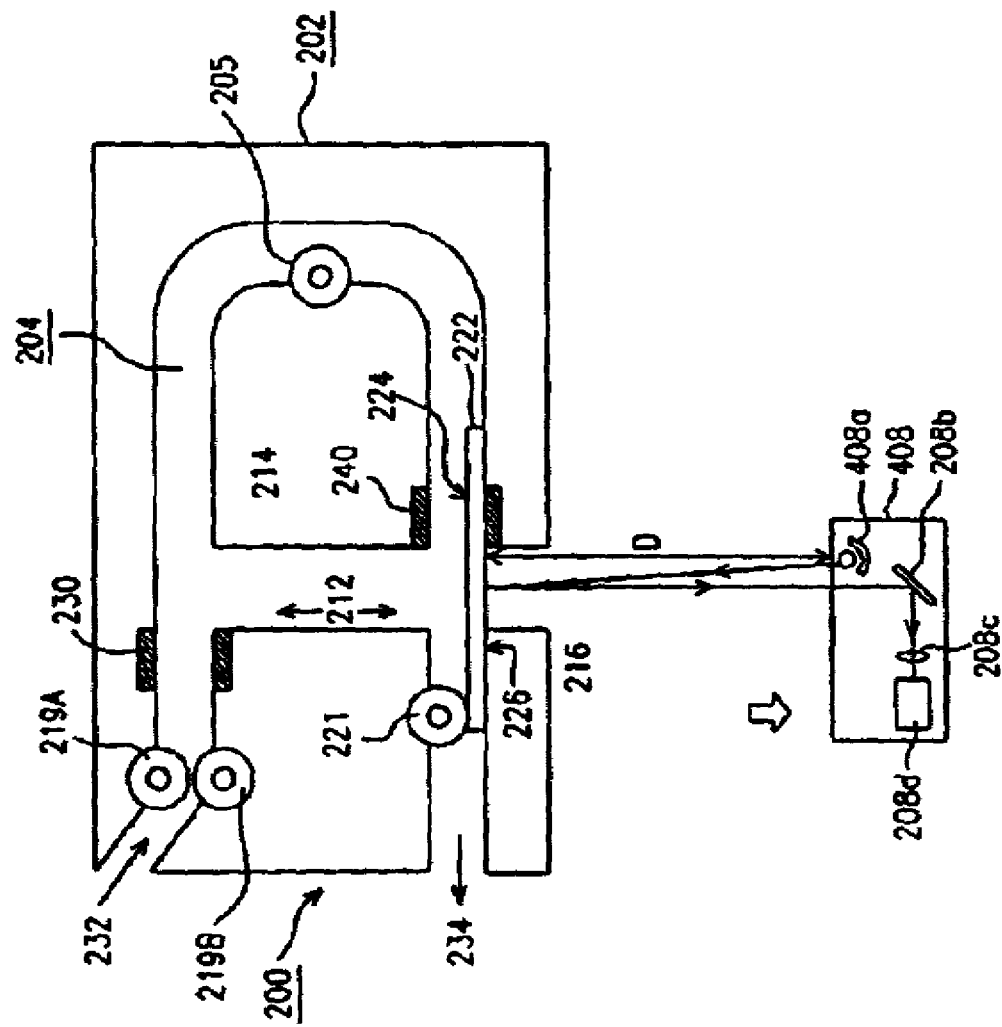

FIG. 5 shows the process flow for using the double-side image scan module 200 to perform double-side scanning on the document. FIGS. 6A and 6B shows the process of feeding and scanning the document.

Referring to FIGS. 5 and 6A, in step S502, the document 222 is fed into the paper feeder 202 along the direction denoted by the arrow 232. Before the document 222 reaching the first-side scanning region 214, the user can decide whether the first side 224 or the second side 226 of the document 222 is to be scanned. As mentioned above, by switching on/off (enabling or disabling) the sensors 230 and/or 240, the first and/or second sides 224 and 226 of the document 222 are detected. In step S304, the sensor 230 is disabled when the first side 224 of the document 222 is not to be scanned. Consequently, the image extraction apparatus 408 is not activated. In step S508, the document 222 is turned up side down after traveling through the paper-turning region 204a and approaches the second-side scanning region 216. On the contrary, in step S504, the sensor 230 is enabled to emit a signal when the first side 224 of the document 222 is to be scanned. The driving device thus raises the image extraction apparatus 408 to result in a distance D between the document 222 and the image extraction apparatus 408. The image information of the first side 224 of the document 222 is thus extracted when the document 222 passes through the first-side scanning region 214. Similarly, after the completely leaving the first-side scanning region 214, the document 222 is turned up side down through the paper-turning region 204a to approach the second-side scanning region 216.

The mechanism for scanning the first side 224 of the document 222 is illustrated in FIG. 6A. As shown in FIG. 6A, when the document 222 is located in the first scanning region 214, the first side 224 thereof is facing the transparent channel 212. Therefore, the image of the first side 214 is readable to the image extraction apparatus 408. The light of the light source 408a incident on the first side 224 of the document 222 is reflected into the reflector 208b. The reflector 208b includes a mirror. Being reflected by the reflector 208, the light of the image reflected from the reflector 208b is collimated, converted and focused before entering the image extraction device 208d.

When the document 222 enters the second-side scanning region 216, similarly, when the second side 226 is not to be scanned in the step S510, the sensor 240 is disabled, while the image extraction apparatus 408 is inactive. In step S514, the document is transmitted out of the image scanner module 200 from the paper-transmission region 220. If in step S510, the second side 226 is to be scanned, the sensor 240 is enabled to output a signal. Meanwhile, driven by the driving device, the image extraction apparatus 408 is lowered to keep the same distance D to the document 222 for extracting the image information of the second side 226 of the document 222. The image information of the second side 226 is extracted when the document 222 travels through the second-side scanning region 216 in step S512. After the second side 216 has been scanned in step S512, the document 222 is discharged from the paper feeder 202 (the double-side image scanner module 200) along the arrow 234.

Similarly, the mechanism for scanning the second side 226 is shown in FIG. 6B. In FIG. 6B, the document 222 is turned up side down after traveling through the paper-turning region 204a. The document 222 is then located at the second-side-scanning region 216 with the second side 226 facing the image extraction apparatus 408. The image of the second side 226 can thus be extracted.

In steps S506 and S512, the height/level of the image extraction apparatus 408 is adjusted to keep a constant distance between the document and the image extraction apparatus for scanning both the first side 224 and the second side 226. As a result, the same image quality can be obtained.

In addition, as mentioned in the first and second embodiments as shown in FIGS. 2, 4A, 4B, 6A and 6B, the length of the paper-turning region 204a, that is, the distance between the first- and second-side scanning regions 214 and 216, of the U-shape paper-feeding through-channel 204 is preferably larger than the length of the document 222. Further, each part of the paper-feeding through-channel 204 has to be adjusted for the application of various kinds of scanners.

In this embodiment, a double-side image scanner module 200 comprises a paper feeder 202 and an image extraction apparatus 608.

The allocation, structure and function of the paper feeder 202 are similar to those of the paper 202 described in the first embodiment.

Figure 7A:
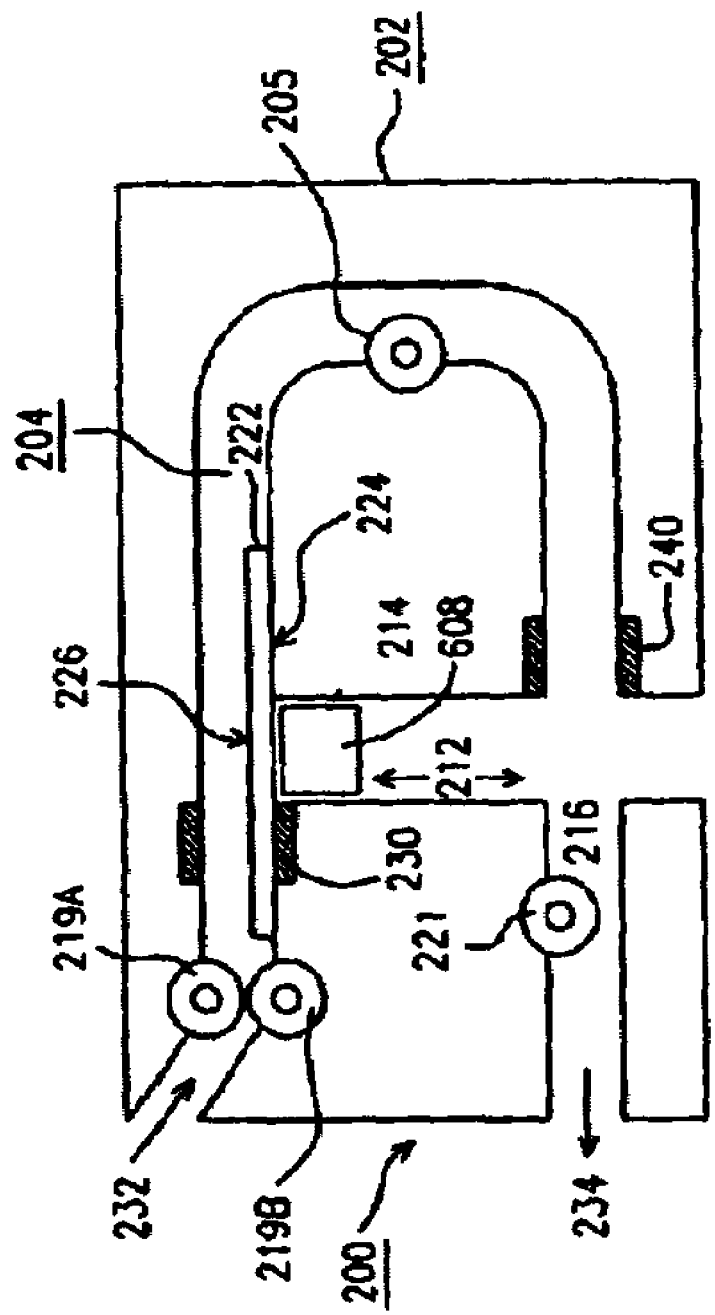
FIGS. 7A and 7B show the cross-sectional views of a double-side image scanner module in a third embodiment of the present invention.
Figure 7B:
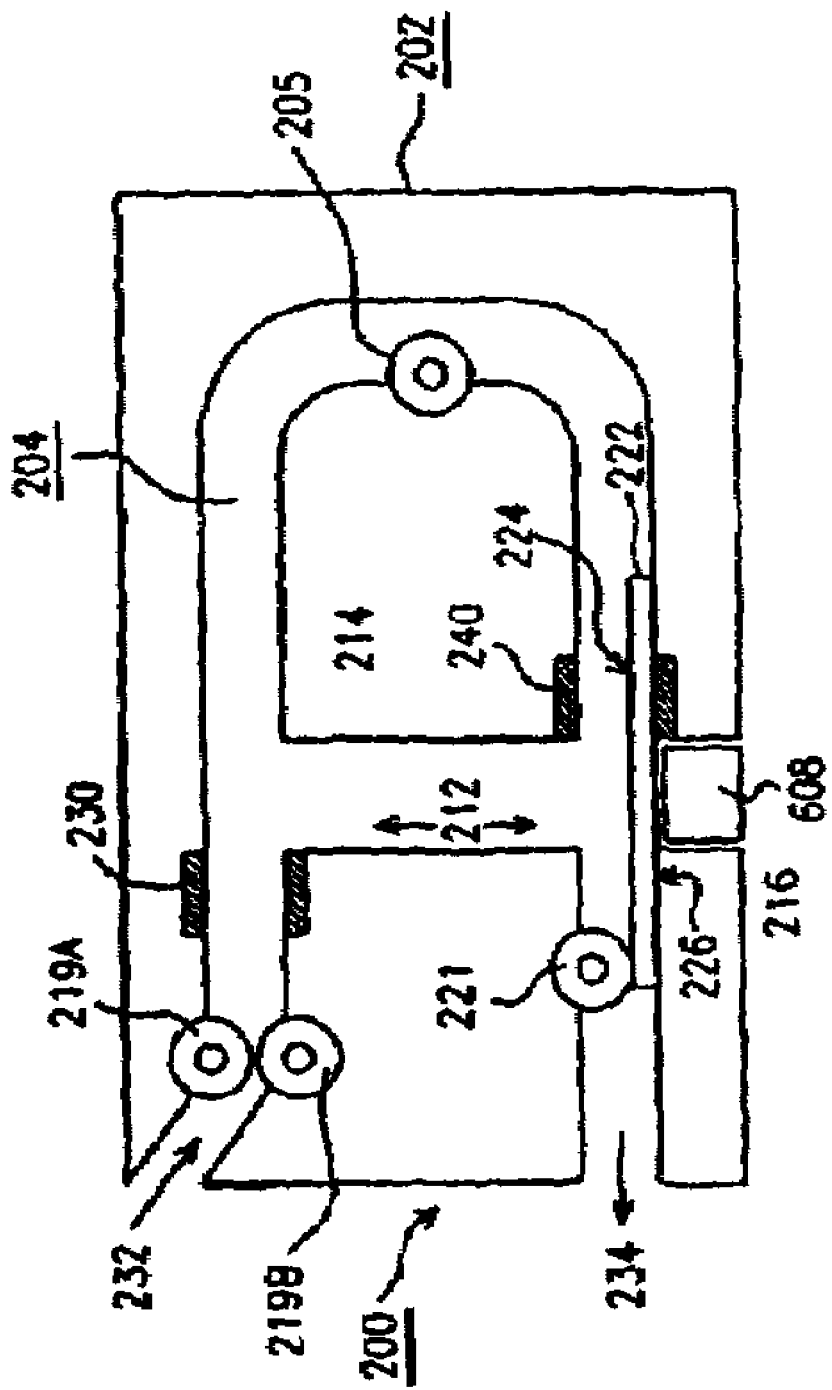

Referring to FIGS. 7A and 7B, according to the paper feeding direction of the paper feeder 202, the image extraction apparatus 608 (referring to 208 in FIG. 2) is aligned with the first- and second-side scanning regions 214 and 216, horizontally or vertically. In this embodiment, the image extraction apparatus 608 is mounted on a driver apparatus (not shown). Therefore, the image extraction apparatus 608 is moveable to adjust the distance to the first-side scanning region 214 and the second-side scanning region 216. The size of the image extraction apparatus 608 is so designed to allow the image extraction apparatus 608 entering the transparent channel 212. Therefore, the image extraction apparatus 608 can be located adjacent to the first-side scanning region 214 and the second-side scanning region 216. The image extraction apparatus 608 includes charge-coupled device or contact image sensor (CIS).

In this embodiment, sensors 230 and 240 are mounted at the paper-transmission region 218 and the paper-turning region 204a. The operation theory and function of the sensors 230 and 240 are similar to those described in the first embodiment.

Referring to FIG. 5, the scanning process by using the double-side image scanner module is similar to the scanning process applied to the double-side image scanner module 200 described in the second embodiment. Therefore, only the different part is introduced as follows.

In this embodiment, the image extraction apparatus 608 can enter the transparent channel 212. Therefore, when the first side 224 of the document 222 is scanned in step S504, the sensor 230 is enabled to emit a signal which allows the driver apparatus to drive the image extraction apparatus 608 entering the transparent channel 212 until immediately under the first-side scanning region 214. The first side 224 of the document 222 is thus scanned, and the image information of the first side 224 is extracted by the image extraction apparatus 608 while traveling through the first-side scanning region 214.

When the second side 226 is scanned in step S510, the sensor 240 is enabled to emit a signal. Meanwhile, the driver apparatus is activated to lower the image extraction apparatus 608 to the position immediately under the second-side scanning region 216 to extract the image information of the second side 226 of the document 222.

In steps S506 and S512, the positions of the image extraction apparatus 608 are adjusted adjacent to the first- and second-side scanning regions 214 and 216 to maintain a constant scanning distance. Therefore, the same image quality can be obtained for both the first side 224 and the second side 226. In addition, the close-up configuration between the image extraction apparatus 608 and the document 222 allows the image extraction apparatus 608 adapting either the charge-coupled device or the contact image sensor.

In the first, second and third embodiments illustrated in FIGS. 2, 4A, 4B, 6A, 6B, 7A and 7B, the length of the paper-turning region 204a or the distance between the first- and second-side scanning regions 214 and 216 is preferably no shorter than the length of the document 222. Further, each part of the paper-transmission through-channel 203 has to be adjusted applicable to various kinds of scanners.

According to the above, by installing two sensors to detect the first and second sides of the document before traveling over the transparent channel, the same image quality can be obtained for both sides. Further, by switching on or off the sensor, the mode can be controlled as the single-side or double-side scanning.

The image scanner module requires only one image extraction apparatus. Therefore, the structure is simple, the height of the double-side image scanner module can be reduced, the volume thereof can be decreased, and the fabrication cost is reduced.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A double-side image scanner module, comprising:
    a paper feeder comprising:
        a paper-feeding through-channel capable of transmitting a document, the paper-feeding through channel comprising:
            a first-side scanning region,
            a second-side scanning region aligned with the first-side scanning region, and
            a paper-turning region between the first-side scanning region and the second-side scanning region, said paper-turning region capable of turning the document up side down;
    an image extraction apparatus aligned with both the first- and second-side scanning regions, said image extraction apparatus capable of extracting images of the first and second sides of the document through the first- and second-side scanning regions, respectively; and a light transparent channel from both the first- and the second-side scanning regions to the image extraction apparatus, the light transparent channel capable of passing light between the image extraction apparatus and the first and second sides of the documents located at the first- and second-side scanning regions, respectively.

2. The double-side image scanner module according to claim 1, wherein the image extraction apparatus is capable of being driven to enter the light transparent channel immediately under the first-side scanning region to scan the first side, and immediately under the second-side scanning region to scan the second side.

3. The double-side image scanner module according to claim 1, wherein the image extraction apparatus is capable of being driven to obtain a constant distance to the first-side scanning region and to the second-side scanning region.

4. The double-side image scanner module according to claim 1, wherein the distance between the first-side scanning region and the second-side scanning region is no less than the length of the document.

5. The double-side image scanner module according to claim 1, wherein the paper-turning region has a length no less than the length of the document.

6. The double-side image scanner module according to claim 1, wherein the image extraction apparatus includes a light source capable of adjusting according to images of the first and second sides of the document.

7. The double-side image scanner according to claim 1, wherein the image extraction apparatus includes an adjustable light source capable of allowing images of both the first and second sides of the document extracted by the image extraction apparatus with substantially identical quality.

8. The double-side image scanner according to claim 1, further comprising a plurality of document transmission members along the paper-feeding through-channel capable of transmitting the document, wherein the document transmission members include a plurality of rollers.

9. The double-side image scanner module according to claim 1, wherein the paper feeder further comprises a first sensor capable of detecting the document entering the first-side scanning region, and a second sensor capable of detecting the document entering the second-side scanning region.

10. The double-side image scanner module according to claim 9, wherein the first and second sensors are capable of switching on/off manually to determine which side of the document is to be scanned.

11. The double-side image scanner module according to claim 9, wherein the first and second sensors are in electrical or optical communication with the image extraction apparatus, and are capable of transmitting a signal to the image extraction apparatus upon detection of the document.

12. The double-side image scanner module according to claim 11, wherein the image extraction device includes a light source capable of adjusting according to the detection of the document by the first and second sensors.

13. A double-side image scanner module, comprising:
a paper feeder comprising:
a first paper-transmission channel capable of receiving a document with a first side thereof facing downwardly,
a second paper-transmission channel capable of receiving the document with a second side thereof facing downwardly, and
a paper-turning region connected between the first and second paper-transmission channels to transmit the document from the first paper-transmission channel to the second paper-transmission channel;

an image extraction apparatus capable of extracting images of the first and second sides of the document; and
a light transparent channel extending between the first or the second paper-transmission channel and the image extraction apparatus;
wherein the image extraction apparatus is capable of being driven to adjust a distance between the image extraction apparatus and the first and second paper-transmission channels when the first or second sides of the document are to be scanned through the light transparent channel.

14. The double-image scanner according to claim 13, wherein the image extraction apparatus is capable of being driven to enter the light transparent channel immediately under the first-side scanning region, and immediately under the second-side scanning region.

15. The double-side image scanner module according to claim 13, wherein the image extraction apparatus is capable of being driven to obtain a constant distance to the first-side scanning region and to the second-side scanning region.

16. The double-side image scanner according to claim 13, further comprising a plurality of transmission members along the first paper-transmission channel, the paper-turning region and the second paper-transmission channel, the plurality of transmission members capable of transmitting the document, and wherein the plurality of document transmission members include a plurality of rollers.

17. The double-side image scanner according to claim 13, wherein the second paper-transmission channel is substantially parallel to the first paper transmission channel, and wherein the paper-turning region is substantially perpendicular to both the first and the second paper-transmission channels.

18. The double-side image scanner according to claim 13, wherein the first paper-transmission channel is positioned above the second paper-transmission channel.

19. The double-side image scanner according to claim 13, further comprising a first sensor substantially located at the first paper-transmission channel and a second sensor substantially located at the paper-turning region, said first and second sensors capable of selectively activating single-side scanning between the first and the second sides or double-side scanning thereof.

20. The double-side image scanner module according to claim 13, wherein the image extraction apparatus further comprises an adjustable light source capable of allowing the images of the first and second sides of the document extracted thereby to have substantially identical quality.

21. The double-side image scanner module according to claim 13, wherein the first paper-transmission channel, the paper-turning region, and the second paper-transmission channel construct a substantially U-shaped paper-feeding through-channel.

22. A scanning method, comprising:
feeding a document into a paper-feeding through-channel of a double-side image scanner module with a first side of the document facing an image extraction apparatus while passing over a light transparent channel;
scanning an image of the first side by the image extraction apparatus through the light transparent channel;
transmitting the document along the paper-feeding through-channel until a second side of the document is facing the image extraction apparatus while passing over the light transparent channel at a different height; and
scanning an image of the second side by the image extraction apparatus through the light transparent channel.

23. The method according to claim 22, further comprising adjusting a light source of the image extraction apparatus before scanning the first side of the document.

24. The method according to claim 23, further comprising adjusting a light source of the image extraction apparatus before scanning the second side of the document.

25. The method according to claim 22, further comprising adjusting a distance between the first side and the image extraction apparatus before scanning the first side.

26. The method according to claim 22, further comprising adjusting a distance between the second side and the image extraction apparatus before scanning the second side.

27. A scanning method comprising:
   feeding a document into a first paper-transmission region with a first side of the document facing an image extraction apparatus;
   adjusting a light source emitting light incident onto the first side when the first side is to be scanned, so as to obtain an image thereof;
   transmitting the document through a paper-turning region and turning the document with a second side of the document facing the image extraction apparatus; and
   adjusting the light source emitting light incident onto the second side when the second side is to be scanned, so as to obtain an image of the second side.

28. The method according to claim 27, further comprising determining whether the first side is to be scanned, wherein the light source remains unchanged when the first side is not to be scanned.

29. The method according to claim 27, further comprising determining whether the second side is to be scanned, wherein the light source remains unchanged when the second side is not to be scanned.

30. The method according to claim 27, wherein the light source is so adjusted for scanning the first side and the second side that the quality of the images obtained therefrom is substantially identical.

31. The method according to claim 27, wherein the first side of the document faces the image extraction apparatus while passing over a light transparent channel and the second side of the document faces the image extraction apparatus while passing over the light transparent channel at a different height.

32. A scanning method comprising:
   feeding a document into a first paper-transmission region with a first side of the document facing an image extraction apparatus;
   adjusting a distance between the image extraction apparatus and the first side when the first side is to be scanned, so as to obtain an image thereof;
   transmitting the document through a paper-turning region and turning the document with a second side of the document facing the image extraction apparatus; and
   adjusting a distance between the image extraction apparatus and the second side when the second side is to be scanned, so as to obtain an image of the second side.

33. The method according to claim 32, wherein the distance between the image extraction apparatus and the first side is substantially the same as that between the image extraction apparatus and the second side.

34. The method according to claim 33, wherein the distance between the image extraction apparatus to the first and the second sides are so adjusted to obtain substantially the same image quality from the first and second sides.

35. The method according to claim 32, further comprising determining whether the first side is to be scanned and determining whether the second side is to be scanned.

36. The method according to claim 32, wherein the first side of the document faces the image extraction apparatus while passing over a light transparent channel and the second side of the document faces the image extraction apparatus while passing over the light transparent channel at a different height.

37. An apparatus, comprising:
   a paper-feeding through-channel comprising a first-side scanning region, a second-side scanning region, and a paper-turning region, wherein the paper-turning region is positioned between the first-side scanning region and the second-side scanning region and is capable of turning a document up side down between the first and second side scanning regions; and
   an image extraction apparatus capable of extracting images of the first and second sides of the document through the first- and second-side scanning regions, respectively, wherein the image extraction apparatus comprises a light source capable of being adjusted according to images of the first and second sides of the document.

38. The apparatus of claim 37, wherein the image extraction apparatus is capable of being driven to obtain a constant distance to the first-side scanning region and to the second-side scanning region.

* * * * *

UNITED STATES PATENT AND TRADEMARK OFFICE
CERTIFICATE OF CORRECTION

PATENT NO.       : 7,612,925 B2  
APPLICATION NO. : 10/064700  
DATED            : November 3, 2009  
INVENTOR(S)      : Wen-Chao Tseng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1602 days.

Signed and Sealed this

Nineteenth Day of October, 2010

David J. Kappos  
*Director of the United States Patent and Trademark Office*

UNITED STATES PATENT AND TRADEMARK OFFICE
CERTIFICATE OF CORRECTION

PATENT NO. : 7,612,925 B2
APPLICATION NO. : 10/064700
DATED : November 3, 2009
INVENTOR(S) : Wen-Chao Tseng It is certified that error appears in the above-identified patent and that said Letters Patent is hereby corrected as shown below:

Title page, column 2, item (57); line 8 (Abstract): Delete "scan" and insert -- scanning --, therefor;

Column 8, line 67 (Claim 1): Delete "respectively;" and insert -- respectively, --, therefor; and Column 12, line 35 (Claim 37): Delete "regions;" and insert -- regions, --, therefor.

Signed and Sealed this

Twenty-first Day of December, 2010

David J. Kappos
*Director of the United States Patent and Trademark Office*